(12) United States Patent
Veit et al.

(10) Patent No.: US 7,819,621 B2
(45) Date of Patent: Oct. 26, 2010

(54) METHOD AND APPARATUS FOR SEPARATING ROD-SHAPED BODIES

(75) Inventors: Gustav Veit, Reutlingen (DE); Peter Hammerer, Bad Hindelang (DE)

(73) Assignee: Wafios Aktiengesellschaft, Reutlingen (DE)

( * ) Notice: Subject to any disclaimer, the term of this patent is extended or adjusted under 35 U.S.C. 154(b) by 398 days.

(21) Appl. No.: 11/947,605

(22) Filed: Nov. 29, 2007

(65) Prior Publication Data

US 2008/0131256 A1   Jun. 5, 2008

(30) Foreign Application Priority Data

Nov. 30, 2006   (EP) .................. 06024858

(51) Int. Cl.
*B66F 11/00* (2006.01)

(52) U.S. Cl. ............. 414/746.1; 414/745.7; 414/745.9; 414/751.1; 414/730; 901/35; 901/46; 700/258

(58) Field of Classification Search ............. 198/468.6; 414/5, 729–733, 738–739, 745.1–745.2, 414/745.4–745.9, 746.1–746.4, 751.1, 753.1, 414/799; 700/258; 901/35, 46
See application file for complete search history.

(56) References Cited

U.S. PATENT DOCUMENTS

| | | | |
|---|---|---|---|
| 4,548,537 A | | 10/1985 | Kubotera et al. |
| 4,718,805 A | * | 1/1988 | Becker ................ 414/22.54 |
| 4,766,322 A | * | 8/1988 | Hashimoto ............ 250/559.33 |
| 5,549,442 A | * | 8/1996 | Crorey ................ 414/751.1 |
| 6,485,251 B1 | * | 11/2002 | Fisher ................ 414/745.1 |
| 6,503,046 B1 | | 1/2003 | Saiki et al. |

FOREIGN PATENT DOCUMENTS

| | | | |
|---|---|---|---|
| DE | 229 974 A1 | | 11/1985 |
| DE | 36 30 726 A1 | | 3/1988 |
| DE | 41 37 518 C2 | | 5/1993 |
| DE | 43 36 753 C2 | | 5/1995 |
| DE | 100 16 036 C2 | | 10/2001 |
| DE | 699 22 469 T2 | | 12/2005 |
| EP | 0 790 086 B1 | | 8/1997 |
| EP | 1 230 047 B1 | | 8/2002 |
| EP | 1375022 A2 | * | 1/2004 |
| EP | 1 415 939 B1 | | 3/2006 |
| FR | 2 526 769 | | 11/1983 |
| GB | 2 194 931 A | | 3/1988 |
| GB | 2194931 A | * | 3/1988 |

* cited by examiner

*Primary Examiner*—Gregory W Adams
(74) *Attorney, Agent, or Firm*—Patterson Thuente Christensen Pedersen, P.A.

(57) ABSTRACT

In order to separate rod-shaped bodies from a bundle of bodies, the surface of an uppermost body in the bundle is determined in a separation apparatus by a sensor, which body is then seized laterally of the sensor by a first gripper and is vertically lifted, whereupon a further gripper engages under said body, laterally of the first gripper unit. The further gripper is then moved to the other end region of the body, with the body being lifted out of the bundle. Next, said body is moved to a deposition location by both grippers.

24 Claims, 6 Drawing Sheets

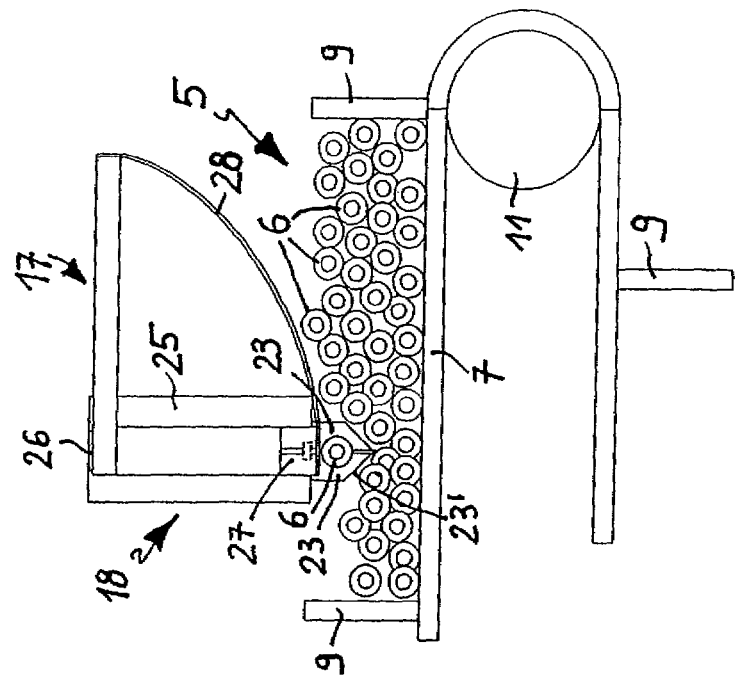
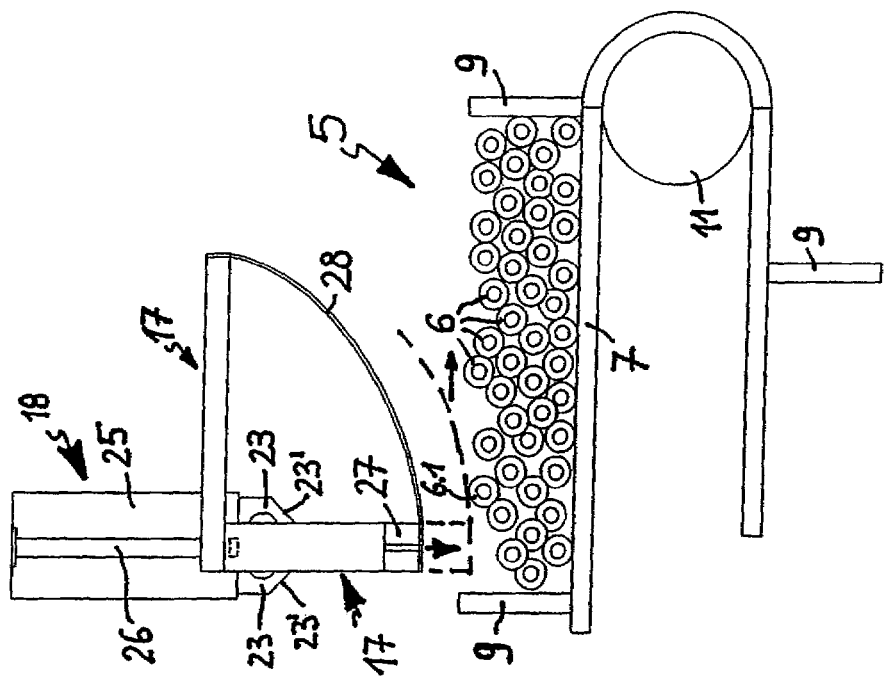

METHOD AND APPARATUS FOR SEPARATING ROD-SHAPED BODIES

RELATED APPLICATION

The current application claims the benefit of priority to European Patent Application No. 06 024 858.0 filed on Nov. 30, 2006. Said application is incorporated by reference herein.

FIELD OF THE INVENTION

The invention relates to a method and to an apparatus for separating rod-shaped bodies from a bundle of such bodies.

BACKGROUND OF THE INVENTION

Rod-shaped bodies, such as sections of wires, pipes, tubes, or the like, which are supplied in the form of roughly oriented, but otherwise disordered, entangled bundles, often need to be separated from the supplied bundles prior to further processing and to be deposited in an orderly arrangement and buffered, before they are then subjected to further processing, such as mounting, finishing, bending, or the like.

German patent DE 4137518 C2 discloses an arrangement for separating rod-shaped bodies, wherein the bundle of bodies is placed in a cavity formed by a continuous conveyor belt, in which cavity the bundle is disentangled by the movement of the belt, the bodies are separated from each other via depressions in the belt and conveyed out of the cavity towards a discharging station. However, this has the disadvantage that only a bundle of bodies of a very limited size can be received in the cavity, and after separation of the bodies has been effected, the cavity has to be filled again.

In the separating arrangement for long, thin pipes disclosed in DE 4336753 C2, a bundle of pipes is placed on a segmented table comprising depressions for receiving individual pipes. By manual shifting of the pipes on the table, the pipes are moved into the depressions and, thus arranged, can be conveyed into a magazine and received there as a supply for a processing machine. However, the manual introduction of the pipes into the receiving grooves of the receiving table has turned out to be very disadvantageous.

DE 100 16 036 C2 discloses a step conveyor for rod-shaped bodies, comprising step elements which are supported relative to each other in a cyclically displaceable or rotatable manner for transport of the workpieces and which cooperate to convey the workpieces in a step-like manner. However, the use of this technology requires that the elongated bodies to be conveyed have no flexible portions and are not pre-mounted either, because this known arrangement will be unsuitable in these cases.

The same disadvantage also applies with respect to the prior art known from European patent publication EP 1 230 047 B1, wherein wires are separated from a disordered bundle via a plurality of sequentially arranged combing out wheels.

EP 0 790 086 B1 describes a method and an apparatus for separation and further processing of metal rods from a bundle, wherein one end of the bundle is lifted so that several rods are engaged by a magnetic holding means. Their positions can be determined by a suitable measuring device, and a favorably located metal rod can be seized by a gripper which then pulls the rod out of the bundle in a longitudinal direction and deposits it on a depositing table. However, in this case the bundle has to be laterally guided when lifting it so as to avoid dropping the metal rods. Moreover, no buffering region is provided between a subsequently arranged processing machine and the separating apparatus.

EP 1 415 939 B1 and DE 699 22 469 T2 disclose a separating arrangement wherein an end part of a bundle of rods is seized and lifted by shear-like grippers, the closing movement of said grippers having the result that ultimately only one rod remains seized between them. This separated rod is deposited via an inclined plane extending below it and is separated over its entire length. However, this has the disadvantage that fixing in the gripper may not be sufficient in case of stronger axial forces, and moreover the picked up rods must not comprise any nuts or the like in the gripping region.

SUMMARY OF THE INVENTION

In view of the above, it is an object of certain embodiments of the invention to propose a method and an apparatus for separating elongated bodies from a bundle of such bodies, wherein no manual intervention is required, the bodies to be separated may even comprise flexible portions or be prefabricated and, moreover, even rod-shaped bodies of greater lengths (for example, of lengths starting from 1.50 m) can be treated without difficulty. Further, particularly great flexibility is to be ensured with respect to the rod-shaped bodies to be separated.

According certain embodiments of the invention, this object is achieved by a method for separating rod-shaped bodies from a bundle of such bodies which are supplied in a transport device and are arranged transversely to said transport device, wherein the vertical position of a detection region at the surface of a body's portion located at the top of the bundle at a lateral end region thereof is determined by a sensor means, that is, a sensor; then the body is seized by a first gripping means, that is, a first gripper, at a pick-up location which is laterally adjacent to the detection region (as viewed perpendicularly to the conveying direction), is vertically lifted over a predetermined distance and is then seized by a further gripping means, that is, a further gripper, at a location that is offset from the pick-up location (as viewed perpendicularly to the conveying direction) by a predetermined length in the direction of the other end region of the body, whereupon the further gripping means is displaced relative to the seized body, up to the other end region of said body, while the body is lifted from the bundle over the entire length of said body and is moved to a vertical position by the further gripping means during or after displacement of the latter, said vertical position corresponding at least to a predetermined minimum height, with the vertical center lines of the sensor means and of both gripping means or grippers being located in a common vertical plane that extends in a transverse direction perpendicular to the conveying direction, and then the picked-up body is moved to a depositing location by both gripping means or is held in a holding position so as to be transferred to other devices.

In the method according to certain embodiments of the invention, seizing the rod-shaped body first at an end region by the first gripping means, the first gripper, and then lifting it vertically above the bundle makes it possible, in a simple manner, to easily engage under the rod-shaped body, in that portion of the rod-shaped body which is vertically lifted and extends beyond the upper surface of the bundle, at a predetermined distance from the point of application of the first gripping means, the first gripper, using the further gripping means, the further gripper. Due to the fact that the second gripping means, that is, second gripper, in contrast to the first gripping means—only engages under the body to be received, and does not hold it fixed, but is then displaced relative to the body, along the latter, towards the other end region of said body, the body is lifted up out of the bundle, along the entire length of said body, because the further gripping means is not lowered in the process. In doing so, the further gripping means is lifted up to a predetermined minimum height (or higher), said height ensuring that the seized part of the body is located safely above the bundle of bodies from which it is to be separated. Preferably, the seized body is brought up to the same height as at the first gripping means by which it is being securely held. Although the body is being securely held by the first gripping means, this is done such that, during displacement of the further gripping means, the body can perform the upward pivoting movement forced by the displacement of the further gripping means. Since the vertical center lines of the sensor means and of the gripping means are jointly located in a vertical plane that extends, in a perpendicular direction, transversely to the conveying direction, it is ensured that the rod-shaped body separated from the bundle is then already held by the gripping means in an orientation perpendicular to the conveying direction, in which orientation the body is then moved to a deposition location and deposited there in an oriented manner or is held in a holding position for transfer to any other device.

The method according to the invention allows the separation of a multiplicity of different rod-shaped bodies, such as sections of wires, rods, pipes, tubes, shafts, or the like, thereby resulting in a particularly wide and flexible field of application. It also allows the separation of prefabricated bodies, e. g., comprising additional elements, such as screw caps, for example, or bodies comprising flexible body portions, thus contributing to a further extension of the field of use of the method according to the invention. Moreover, the method according to the invention is relatively easy to carry out, requires no manual interventions and allows reliable and relatively quick separation of the bodies from the bundle.

Particularly favorable conditions result, in the method according to the invention, if the detection region of the body to be picked up, which region is detected by the sensor means, the sensor, is located, relative to the pick-up location, at which the first gripping means is applied, on the side thereof facing the other end region. This allows the pick-up location of the body at the lateral end region of the body, at which the sensor means detects, to be located particularly close to the body's end there.

Further, it is particularly favorable if the further gripping means engages under the body, immediately next to the detection region, said detection region itself—again preferably—being provided immediately next to the pick-up location at which the first gripping means seizes the body. On the whole, this will result in very favorable geometric conditions, on the one hand, for pick-up of one end region of the body by the first gripping means and, on the other hand, when the further gripping means engages under the body, which further gripping means, although then being located near the pick-up location, is not located immediately next to said location, so that, especially in the initial region of the lateral displacement of the further gripping means for lifting the body, the lever arm between the location where the further gripping means engages under the body and the location at which the body is being held by the first gripping means does not become too small, which would be more unfavorable for the displacement forces appearing at the further gripping means.

Particularly favorable conditions result if, in the method according to the invention, the further gripping means, having engaged under the body, is continuously lifted towards the other end region during displacement of the further gripping means, such that the further gripping means, at the end of its path of displacement, has already brought the body to the same vertical position at which the body is being held by the first gripping means. This allows the steps of the lateral displacement of the further gripping means and of the continuous lifting of the body to be combined in time thereby, so that the method enables a particularly rapid separation.

For those cases where a great resistance to displacement occurs during displacement of the further gripping means, for example, because the body to be lifted is partially covered or jammed by another body in the bundle, it is particularly advantageous to stop the displacement of the farther gripping means if the resistance to displacement exceeds a predetermined amount, then move the further gripping means back a certain distance in the opposite direction and then move it in the initial direction of displacement again. If necessary, the sequence of these steps may also be carried out several times in order to thereby effect better detachment of the body to be lifted by the further gripping means. However, in this case it may turn out to be particularly convenient to also subject the bundle of elongated bodies to a suitable shaking operation during the return movement of the further gripping means and during the subsequent displacement of said means in the initial direction of displacement in order to also promote disentanglement of the possibly strongly entangled bodies of the bundle, said disentanglement being favorable for lifting the seized body. In order to disentangle the bundle, it is likewise also possible to subject the bundle only to a shaking operation and to dispense with the return movement of the further gripping means.

However, if all these measures should not lead to the desired success even upon repeated execution, the program control used may be designed such that it then releases the picked-up body again through both gripping means, with the gripping means being returned to their original position and the displacement then being started anew and carried out once more with renewed detection of a body located at the top of the bundle, etc.

In one embodiment of the method according to the invention, a proximity sensor is used for the sensor means, which proximity sensor measures the distance from the surface of a surface region located below it in the region of the sensor's vertical center line, said surface region being that of an elongated body present there. In doing so, the sensor means is vertically lowered from above, towards the bundle of elongated bodies located below it, until the sensor means abuts there, and if the value of the distance then measured is greater than a predetermined minimum value, the sensor means is moved over the surface of the bundle, in the conveying direction, relative to said surface up to a location where the measured distance has the predetermined minimum value. Since the employed sensor of the sensor means measures the distance from an elongated body located below it to the surface only below its vertical center line, although the sensor also further extends laterally of the center line, this means that the sensor is on top of the elongated body it contacts only if the measured distance value corresponds to the minimum value. That is, if the sensor is just slightly offset to the side with respect to the uppermost point of the body, the sensor would contact a region that extends laterally beyond the center line, in which case a distance value greater than the minimum value would still be present below the center line.

The above-mentioned object underlying the invention is achieved, in terms of apparatus technology, by an apparatus for separating rod-shaped bodies from a bundle of such bodies, which apparatus can be used, in particular, to carry out the method according to the invention, said apparatus comprising a feeding means, that is, a feeder, for supplying the bundle of rod-shaped bodies along a conveying direction, a separating means, that is, a separator, associated with the feeding means and comprising a portal with a portal guide extending horizontally perpendicular to the conveying direction, said guide having attached to it, displaceable in the longitudinal and vertical direction of said guide, a first gripping means for seizing a rod-shaped body, a sensor means adjacent to the first gripping means, which sensor means is adapted to emit a sensor signal depending on the vertical distance between said sensor means and an elongated body's surface portion, located below said sensor means; as well as a further gripping means which is displaceable along the portal guide and perpendicular thereto, said further gripping means being adapted to engage under an elongated body located below said further gripping means, with the sensor means and all gripping means further being displaceable also in the conveying direction, and said apparatus further comprising also a control means, that is, a controller, to which the sensor signal provided by the sensor means is applied, said control means, the controller, enabling program control of all movement and actuation operations of all movable means of the apparatus according to the invention.

The advantages described above in connection with the method according to the invention equally apply to the apparatus according to the invention, in particular the great flexibility in use for the most diverse rod-shaped bodies. The apparatus according to the invention can be employed, in particular, in connection with a processing apparatus, e. g., for shaping or bending of pipes, ducts, bars, prefabricated ducts etc., but also as part of a supply system for other apparatuses by which such rod-shaped bodies are to be subsequently mounted, packed, stored, counted, or the like, and, therefore, have to be separated or buffered in an orderly arrangement, respectively.

For displacement of the sensor means as well as of the gripping means in the conveying direction, the portal is particularly preferably designed to be displaceable in this direction. However, cases where the portal is fixed and each of said means has its own means assigned to it for displacement in the conveying direction are also conceivable.

In an apparatus according to one embodiment of the invention, the feeding means comprises, at both of its longitudinal sides, two continuous conveyor belts extending parallel to the conveying direction, said belts being provided, at their outwardly directed surfaces, with plate-like elements which protrude perpendicularly to said surfaces and to the conveying direction and which are spaced apart from each other as viewed in the conveying direction, with a receiving space being formed between each pair of successive plate-shaped elements to receive the lateral end regions on one side of the elongated bodies of a bundle. By these two continuous conveyor belts, the bundles of elongated bodies are then held on the continuous conveyor belts at both lateral end regions between two respective plate-shaped elements succeeding each other in the conveying direction and are thus fed to the separating means in the conveying direction.

Particularly advantageously, the apparatus according to one embodiment of the invention is provided with a discharging means, that is, a discharge, which is arranged following the feeding means and the separating means (preferably in the conveying direction) and to which the body lifted by the gripping means can be transferred, preferably deposited there and buffered.

In this case, the discharging means, the discharge, may be provided as a frame comprising an inclined plane which is inclined in the conveying direction and on which the deposited bodies are buffered in succession and in contact with a limit stop. The discharging means may also be provided with an arrangement for lateral alignment of the ends of the deposited elongated bodies.

In this manner, the deposited rod-shaped bodies can be buffered relatively easily with a precise alignment.

A further preferable embodiment of the apparatus according to the invention also consists in that the discharging means, that is, a discharge, has a means assigned to it by which the rod-shaped bodies buffered in the discharging means can be seized therein and transferred from it to a further, subsequently arranged transport or processing station.

In the apparatus according to one embodiment of the invention, the sensor means can be designed in any suitable manner. Particularly preferably, however, the sensor means comprises a proximity sensor allowing to measure the distance from the surface of a surface region of a rod-shaped body which is located below the sensor, in the region of the sensor's vertical center line, and which is to be picked up.

In the apparatus according to the invention, the sensor means is advantageously provided with a guiding ramp having a convex curvature in the conveying direction and extending upwards at its front, approximately in the shape of a bent strip of sheet metal, by means of which ramp the sensor means is displaceable by an impact-free movement relative to the bundle of elongated bodies and over the latter, on their upper side. This allows to ensure, in a particularly easy manner, that the sensor means can be displaced on the upper side of the bundle of rod-shaped bodies in the conveying direction relative to said bundle until the sensor means detects an uppermost portion of such body which is to be picked up.

It is basically possible to attach the sensor means to the portal guide of the portal and to actuate it independently of the first and second gripping means. However, particularly preferably, the sensor means is held on a holding frame of the first gripping means, whereby it can be lowered together with the latter. The sensor means is advantageously supported, in a vertically displaceable manner, in a holding flange of the holding frame, which flange protrudes perpendicularly and transversely to the conveying direction, with a stop being provided to limit the movement of the sensor means vertically downwards. Thus, by lowering the first gripping means, it is possible to also lower the sensor means until it contacts the surface of the bundle of rod-shaped bodies arranged below it and to still continue the lowering movement of the first gripping means somewhat beyond this point, so that the sensor means, during the subsequent movement in the conveying direction, can move up and down over the surface of the bundle without any further change of the lowering position of the first gripping means as a result of being displaceably supported within the latter in correspondence with the surface of the bundle, independently of the first gripping means and relative to the latter.

In this connection, the sensor means may be located laterally immediately adjacent to the first gripping means, which may have the result that the pick-up location of the respective body, at which said body is seized by the first gripping means, is located at a vertical position similar to that of the sensor means, and thus a difference in height between the detection region and the pick-up location, which is caused by an inclination of the body to be seized and which would have to be considered in case of a somewhat greater distance between these two when controlling the first gripping means, is negligible.

The first gripping means itself may be provided in any suitable manner allowing the body to be seized. Particularly preferably, however, the first gripping means comprises two gripping jaws for seizing the rod-shaped body between them. Again preferably, both gripping jaws are provided with inclined external surfaces on their sides facing away from each other, said external surfaces converging towards each other in a downward direction, i. e., towards the free end of the respective gripping jaw. The wedge shape achieved thereby allows adjacent workpieces to be pushed aside when lowering the gripping jaws while moving towards the pick-up location.

In the apparatus according to one embodiment of the invention, it is further advantageous if the further gripping means also comprises two rotatable arms having, at their free ends, guiding webs which point towards each other and contact each other with their end surfaces in the closed state of the further gripping means so as to engage under the elongated body to be picked up. When displacing the further gripping means relative to the body under which it is engaged, it is particularly advantageous, in order to be able to work as free from wear as possible at the friction surface between the guiding webs and said body, to provide each of the two guiding webs at least at its upper surface region, in which it contacts the elongated body, with a suitable anti-wear coating, in which case anti-wear coatings are employed particularly in the form of suitable plastic flocks or plastic casings.

In order to separate particularly long and/or thin bodies with flexible portions, it is further advantageous to provide a third gripping means on the portal guide, which gripping means is displaceable perpendicular to and along said portal guide, is also adapted for engagement under the elongated body and is particularly preferably arranged between the first gripping means and the further gripping means.

In certain cases, it may also be advantageous to provide an apparatus according to the invention with a second sensor means, that is, a second sensor, which can be used to determine the axial position of the elongated bodies in case of a strong inclination of said bodies, so that safe, controlled gripping can be performed by the first gripping means.

Using the separating apparatus according to the various embodiments of the invention, an entangled bundle of slim, elongated bodies can be separated in a simple and relatively rapid manner and, if desired, said bodies can be buffered in an orderly arrangement.

BRIEF DESCRIPTION OF THE DRAWINGS

The invention will be explained in more detail below, principally by way of example, with reference to the drawing, wherein:

FIG. 3 shows an enlarged schematic view of a portion of a separating apparatus according to the invention, with the sensor and the first gripper in the lifted initial position;

FIG. 4 shows a schematic view corresponding to FIG. 3, wherein the first gripping device has seized a body located at the top and has already lifted it somewhat;

DETAILED DESCRIPTION OF THE DRAWINGS

The Figures show a separating apparatus 1 according to one embodiment of the invention, which substantially comprises a portal 2, a feeder 3 as well as a discharge 4 which also serves as a positioning means.

Figure 1:
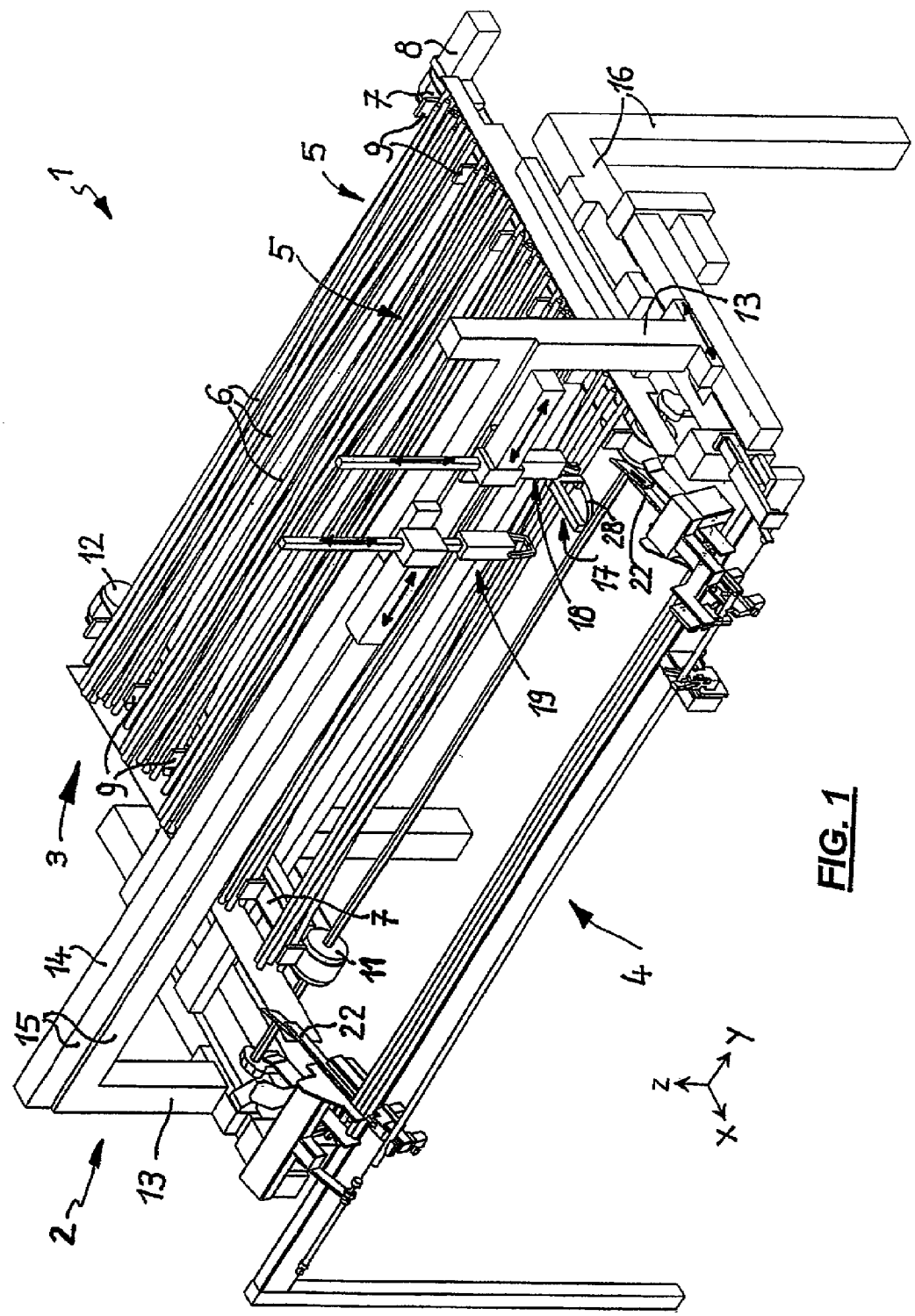
FIG. 1 shows a perspective view (oblique top view) of an apparatus according to the invention, wherein the rear of said apparatus, at which the separated elongated bodies are deposited and buffered, is shown at the front.
Figure 2:
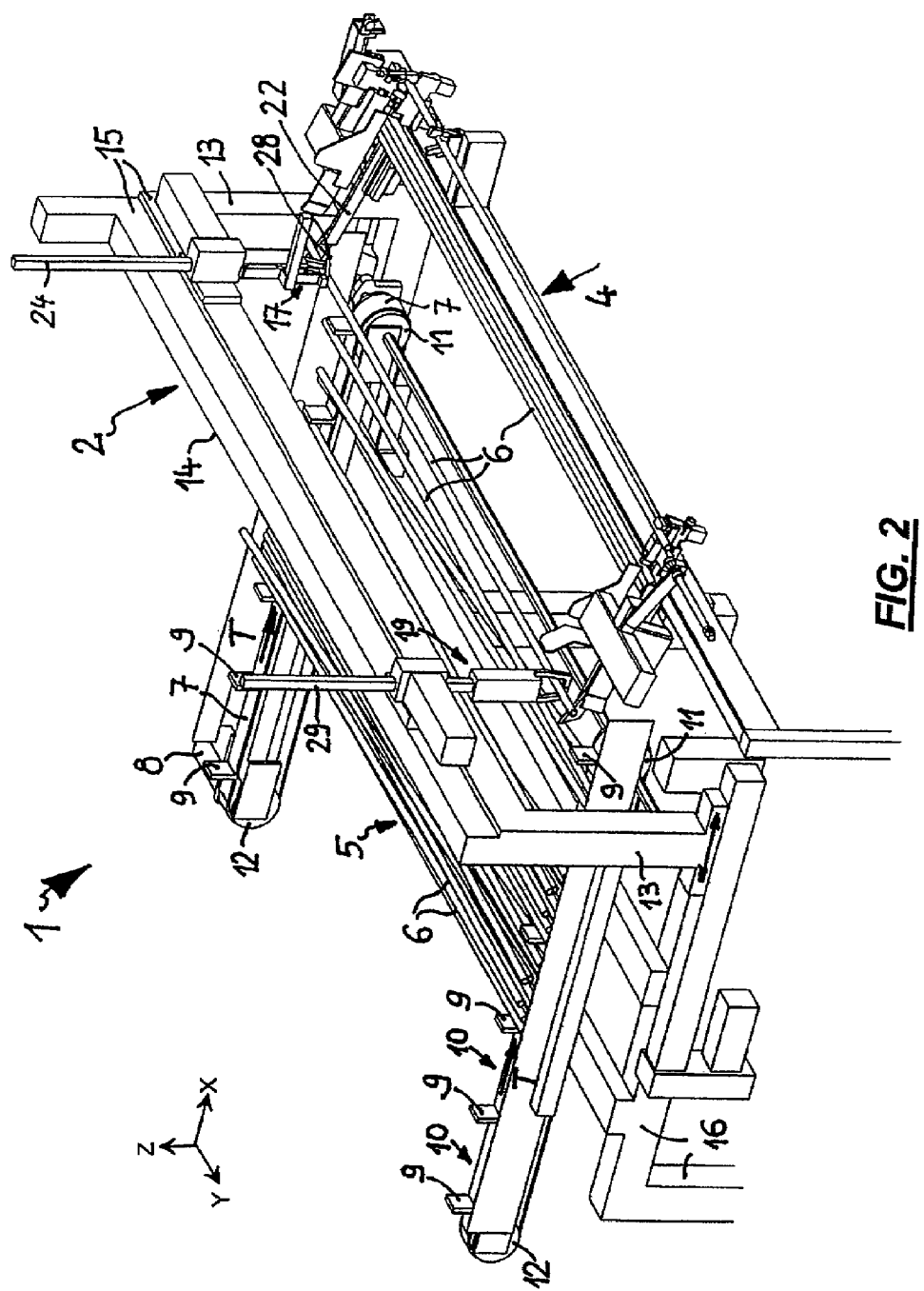
FIG. 2 shows another perspective view (oblique top view) of the separating apparatus according to FIG. 1.

As is clearly evident from FIGS. 1 and 2, there are disposed on the feeding means 3 several bundles 5 of slim, rod-shaped and entangled bodies 6, which are to be disentangled and separated as well as deposited by said separating apparatus 1.

The feeding means 3 comprises two or even more conveyor belts 7 and can be clearly recognized in the illustration of FIG. 2, because the latter—in contrast to FIG. 1—only shows a few bundles 5 of slim bodies 6 in the front region of the conveyor belts 7, as seen in the conveying direction T of the conveyor belts 7, whereas (for better illustration) no elongated bodies 6 are depicted in the rear region of the conveyor belts 7.

The conveyor belts 7 are moved in a synchronized manner via a drive 8, and they have attached to them, equidistantly spaced apart from each other, as viewed in their longitudinal direction, plate-shaped elements 9, each being transverse to the longitudinal direction of the respective conveyor belt 7, in a perpendicular direction, and extending over the entire width of said conveyor belt 7.

The plate-shaped elements 9 represent a sort of separating walls, with a segment-like receiving space 10 being formed between each successive pair of plate-shaped elements 9, in which receiving space 10 the lateral end portions of a respective bundle 5 of elongated bodies 6 are located.

The plate-shaped elements 9, which protrude upwardly in a substantially perpendicular direction from the surface of the respective conveyor belt 7, perpendicular to the conveying direction T, cycle with the continuous conveyor belts 7, i. e. at the conveying-side end of the respective conveyor belt 7, they pivot downwards around the deflection rollers 11 there, together with the conveyor belts 7, return again on the lower side, counter to the conveying direction T, together with the conveyor belt 7, and finally swing upwards via the deflecting rollers 12 there in order to form a receiving space 10 again for a bundle 5 of slim bodies 6 that is to be newly picked up.

The conveyor belts 7 are arranged such that in the overall apparatus at least one of the two conveyor belts 7 (including its associated drive and the corresponding support) can be adjusted perpendicularly transversely to the conveying direction T (i.e., in the direction Y of the coordinate system shown in FIG. 1), allowing the separating apparatus 1 to be used for different lengths of the bodies 6.

As the Figures show, the portal 2 substantially comprises at each of its two end faces a column 13 extending perpendicularly upwards, and a transverse beam 14, which connects the upper ends of the two lateral columns 13 with each other and extends transversely to the conveying direction T, said transverse beam 14 having attached to it a portal guide 15 which extends over the length of the transverse beam 14 (cf. FIGS. 1 and 2).

The portal 2 can be moved in the direction X along the base frame 16 of the separating apparatus 1, which is shown in FIGS. 1 and 2 only in a purely schematic manner by arrows drawn at the base region of the lateral columns 13.

Further, various functional units are mounted to the portal 2, each displaceable along the portal guide 15 in the direction Y. Said functional units are a sensor 17, a first gripper 18 (immediately next to the sensor means 17) and a further (second) gripper 19.

In the embodiment shown in the Figures, the sensor means 17 and the first gripping means 18 can be displaced together in the direction Z (again indicated by arrows in FIG. 1).

In this case, the sensor means 17 (cf. FIG. 6) is carried by the first gripping means 18, via a holding frame 20 connected with the latter, and is supported in the holding frame 20, together with the gripping means 18, so as to be vertically displaceable (in the direction Z) relative to the gripping means 18.

Said support is designed such that it forms a stop (not shown) which limits the movement of the sensor means 17 relative to the first gripping means 18 vertically downwardly.

The sensor means 17 can be freely displaced relative to the first gripping means 18 in a vertical (Z) direction along a guide.

This arrangement of the sensor means 17 and the first gripping means 18 has the functional elements 17 and 18 disposed immediately next to each other laterally (as viewed in the direction Y). This has the consequence that, when the sensor means 17 has detected a body 6 located at the top of a bundle 5, the subsequent process of seizing this body 6 by the first gripping means 18 in the immediate lateral vicinity of that region in which said detection took place can be effected.

As FIGS. 1, 2 as well as 5A, 5B, 5C, 5D, 6 and 7 show, a further, second gripping means 19 is also attached to the transverse beam 14 of the portal 2, with the arrangement of the functional elements 17, 18 and 19 being selected such that the vertical center lines of these three functional units are located in a common vertical plane extending transversely to the conveying direction T as viewed perpendicular to the latter. The further (second) gripping means 19 can also be moved in the direction Y as well as Z.

As is evident from FIGS. 1 and 2, the discharge 4 forms an inclined plane by two frame webs 22 which are inclined in parallel at the rear end of the separating apparatus 1, in the conveying direction T, and are downwardly inclined at the same angle in the conveying direction T. The bodies 6 separated by the gripping units 18 and 19 can be deposited on said inclined plane at their lateral end regions by displacement of the portal 2. As a result of the inclination of the frame webs 22, a deposited elongated body 6 will then roll towards the lower end of the frame webs 22, so that the separated and deposited elongated bodies 6 can then be buffered, lying behind each other, as shown in FIG. 1 or 2. In doing so, they are aligned against a limit stop (not shown) from which they can be suitably fed to a subsequently arranged processing machine, such as a pipe-bending machine. Thus, for example, such pipe-bending machine (not shown in the Figures) could in turn be provided with suitable means removing the elongated body 6 from the positioning and discharging unit 24.

Figure 6:
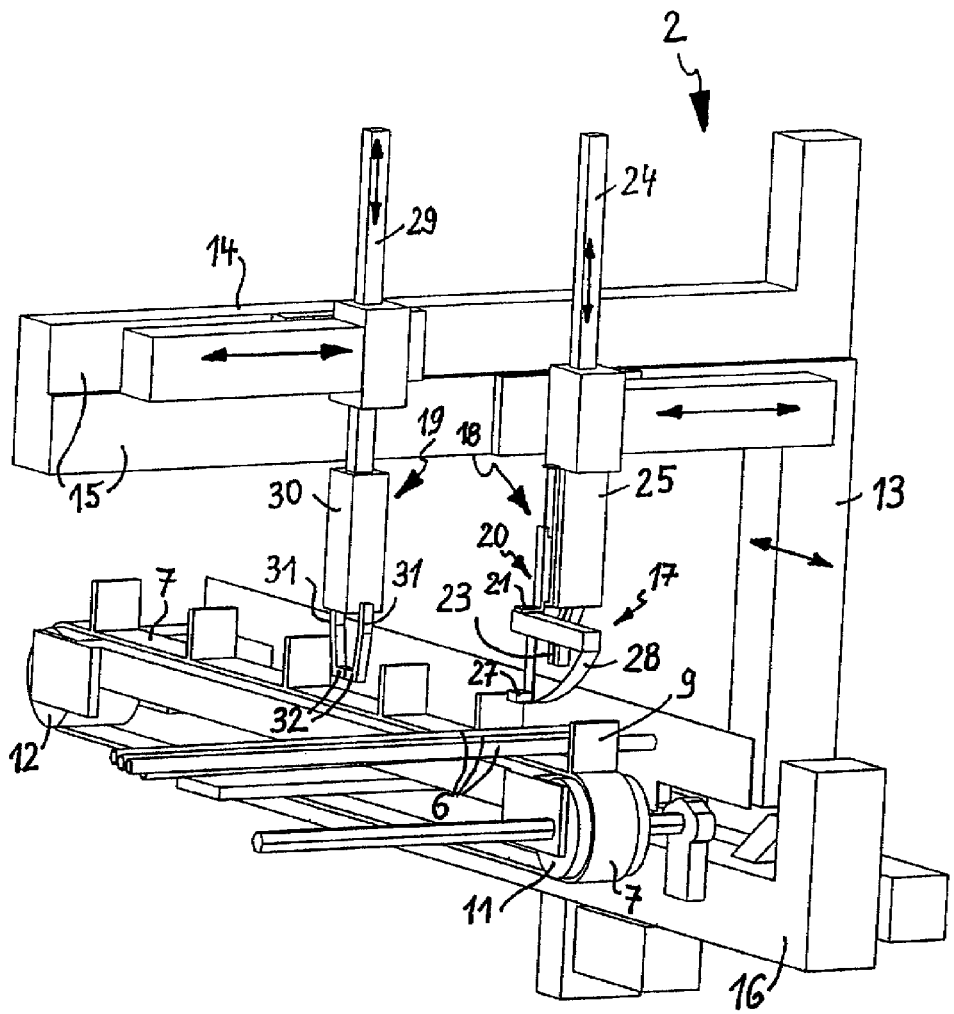
FIG. 6 shows a somewhat enlarged detailed schematic view of a detail of a separating apparatus according to the invention, namely in the initial position of said apparatus, prior to the beginning of the separating method.
Figure 7:
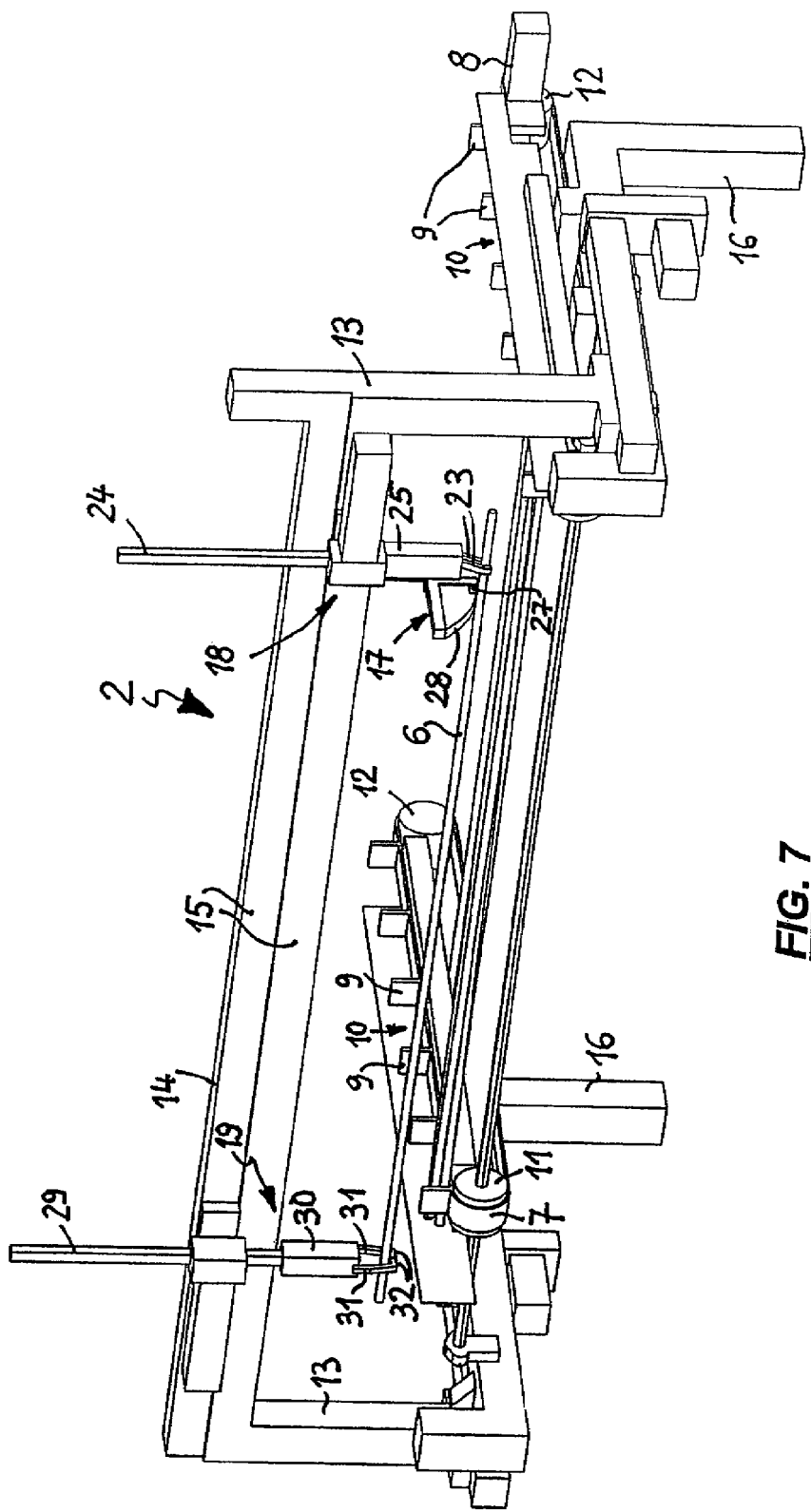
FIG. 7 in turn, shows a schematic perspective view of a detail of a separating apparatus according to the invention, with the body to be seized having already been separated by the gripping means and lifted for deposition.

FIGS. 6 and 7 show enlarged details of a separating apparatus 1 so as to illustrate and assign the individual functional units 17, 18 and 19 to each other more clearly.

As FIG. 7 shows well, the first gripping unit 18 is equipped with two gripping jaws 23 and with a vertically positioned guiding axle 24 (in the form of a toothed rack), which is coupled to a program-controlled drive (not shown) and allows to displace the first gripping means 18 in a vertical direction (Z). In this case, the first gripping means 18 comprises a housing 25, beyond whose lower end the two gripping jaws 23 protrude and beyond whose upper end the vertical guiding axle 24 protrudes.

As already mentioned above, the sensor unit 17 is supported on the housing 25 so as to be vertically movable by being fixed to the holding frame 20 via the holding flange 21, and said holding frame 20 is fitted in a vertical guiding groove 26 in the housing 25 so as to be guided therein in a freely displaceable manner (cf. also the schematic representations of FIGS. 3 and 4 in this connection).

The sensor unit 17 consists of a sensor 27 for identifying a slim body 6, which is located at the top of a bundle 5, and of an arcuate guiding plate 28, which is arranged preceding said sensor 27 in the conveying direction T and extends upwardly in a curved, preferably circular, shape from the lower end of the sensor 27 and serves as a guide plate when displacing the sensor unit 17 in the conveying direction T.

If the housing 25 of the first gripping means 18 is extended downwards via the vertical guiding axle 24, the sensor means 17 can be freely displaced in an upward direction within the guiding groove 26 when it abuts against an obstacle during said extending movement, namely against a slim body 6 located on top.

As the Figures show, the sensor 27 and the gripping jaws 23 are positioned within very close proximity of one another (in the direction Y, as viewed perpendicular to the conveying direction T).

The further (second) gripper 19 is also movable via a vertical guiding axle 29 (again, preferably a toothed rack) in the direction Z (perpendicular to the conveying direction T as well as to the transverse beam 14 of the portal guide 15) (FIGS. 6 and 7). In addition, however, the gripping means 19 can also be displaced in the direction Y (along the portal guide 15 of the transverse beam 14), in the longitudinal direction of the slim body 6 to be picked up.

The further gripping means 19 comprises a housing 30, at whose upper side a vertical guiding axle 29 protrudes upwardly and at whose lower side two rotatable arms 31 protrude downwardly, the lower ends of said arms comprising guiding webs 32, which are directed towards each other and contact each other in the closed state of the gripping means 19, designed to engage under and to support the body 6 to be picked up (cf., in particular, FIGS. 6 and 7).

The two rotatable arms 31 can be shifted to an open, folded-out position, in which they can seize and engage under the body 6 to be picked up, as well as to a closed, folded-in position; all Figures consistently show these arms 31 in their closed position.

Additionally, there is also provided (although not shown in the Figures) a deflecting mechanism, which stops the forward movement during displacement of the further gripping means 19 along the transverse beam 14 (i. e. in the direction Y), if too much axial load (force in the direction Y) acts on the arms 31 or on their guiding webs 32, respectively, during said movement, e.g. because the seized body 6 is not easy to lift up from the bundle 5.

The function of the separating apparatus 1 according to the invention shall now be explained in more detail with reference to FIGS. 5A to 5D:

These Figures show the sequence of a process of separating a body 6 from a bundle 5.

First, as shown in FIG. 5 A, the first gripping means 18 comprising the sensor unit 17 is lowered via the vertical axle 24 until the sensor means 17, which moves down together with the housing 25 of the first gripping means 18, somehow engages the upper side of the bundle 5 of bodies 6 (FIG. 5 A). Next, the portal 2 is moved in the direction X (corresponding to the conveying direction T), while the guide plate 28 moves over the upper sides of the bodies 6 located at the top of the bundle 5 until the sensor means 17 determines an uppermost body 6, whereupon the movement of the portal 2 is stopped.

This process is shown again in detail in a very schematic and greatly magnified representation in FIGS. 3 and 4:

FIG. 3 shows the initial position which the first gripping means 18 occupies with its housing 25 and the sensor means 17 attached thereto in the initial position above the bundle 5 of elongated bodies 6 located below it. Now, if the housing 25 of the first gripping means 18 is lowered down, the guide plate 28 of the sensor means 17 (in the representation of the arrangement according to FIG. 3) first comes into contact, at a location slightly forward of the position of the sensor 27, with an uppermost body 6.1 there, whereby the sensor unit 17 then stays in this resting position (shown in broken lines in FIG. 3). Next, the housing 25 of the first gripping unit 18 is lowered down even further, so that the gripping jaws 23 are still located above the plate-shaped elements 9, between which the elongated bodies 6 are stacked, while the sensor means 17, however, is moved freely upwards via the holding frame 20 (not shown in FIGS. 3 and 4, however) in the guiding groove 26.

In this situation, the sensor means 17 is then moved forward (in the conveying direction T) in the direction of the arrow shown in broken lines in FIG. 3 on the upper side of the bundle 5 of bodies 6 by shifting the portal 2, while the guide plate 28 lifts the sensor 27 up during this forward movement, if the guide plate 28 abuts against a surface region of a body 6 that is located higher up than the lower side of the sensor 27.

The sensor 27 is provided as a proximity sensor and continuously determines, in the direction of its axial center line, the distance between its lower side and the surface of a body 6 located below it in the bundle 5. If this distance measured by the sensor 27 becomes equal to a predetermined minimum value (corresponding to a minimum operational distance of measurement of the proximity switch 27), the sensor 27 has its center line located immediately above a surface portion of a body 6 that is located at the very top of the bundle 5.

In this position, the housing 25 of the first gripping means 18 is then lowered somewhat more, by a predetermined amount, until the opened gripping jaws 23 can reach around this detected uppermost body 6 next to the sensor 27 and seize it by subsequently moving towards each other. Thereupon, the housing 25 with its grippers 23 and the body 6 seized between them is lifted vertically by a predetermined amount which is sufficient for the seized body 6 to be located at least above the end faces of the elements 9, so that it may later be displaced at this height above the bundle 5 without impact.

The condition immediately after the body 6 has been seized by the two gripping jaws 23 of the first gripping means 18 is shown in FIG. 5 B, while FIG. 4 shows a condition shortly thereafter, namely when the seized body 6 has already been lifted somewhat.

Figure 5A:
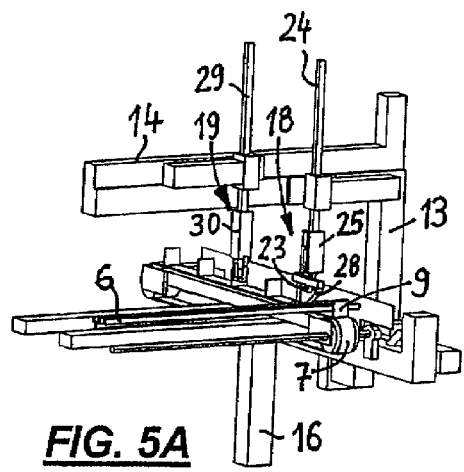
FIGS. 5A, 5B, 5C and 5D show respective schematic representations of the same detail of the separating apparatus according to the invention, with different steps being shown in connection with the separation of an elongated body from a bundle of such bodies.
Figure 5B:
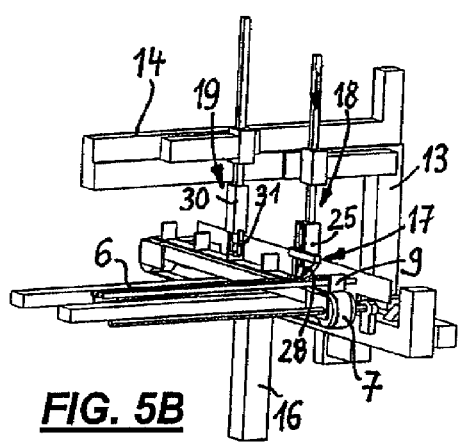
Figure 5C:
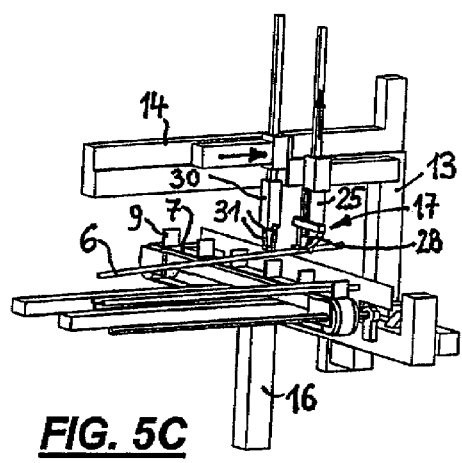
Figure 5D:
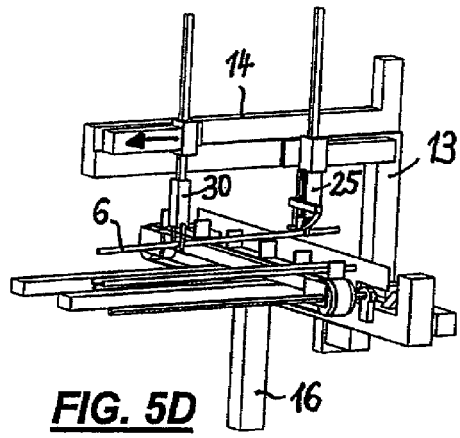

Now, FIG. 5C shows the condition in which the first gripping means 18 has subsequently been moved up to the (predetermined) vertical position up to which this end region of the seized body 6 is to be lifted out of the bundle 5.

Once the sensor 27 has reached and detected an uppermost body 6 as the guide plate 28 slides along the surface of the bundle 5, the first gripping means 18 is controlled and lowered by a control unit (also not shown in the Figures) of the entire apparatus. During this lowering movement, the sensor means 17 is pushed upwards within the guiding groove 26 along the housing 25 until a switch (not shown in the Figures), which is adjustable in height, is triggered, said switch stopping the vertical downward movement of the housing 25 with the gripping jaws 23 and triggering the gripping movement of the gripping jaws 23. The switch is adjusted in height such that, when it is actuated, the gripping jaws 23 are positioned such that they seize the body 6 directly below the sensor 27, as is also evident from the representation of FIG. 4.

The gripping jaws 23 are each provided, at their external surfaces facing away from each other, with a chamfered outer edge 23' such that said outer edges 23' converge towards the freely protruding end of the gripping jaws 23 (in their closed condition), as is also evident from the representations of FIGS. 3 and 4. This wedge shape allows adjacent bodies 6 to be pushed aside during a lowering movement (even if the gripping jaws 23 are then slightly opened). The further, second gripping means 19 is moved towards the sensor means 17 and towards the first gripping means 18 along the transverse beam 14, in the direction Y, already during the upward movement of the first gripping means 18 so as to lift the seized body 6, or only upon reaching the final lifting position. Then, the rotatable arms 31 of the further gripping means 19 are opened, the housing 30 is moved down somewhat, to a predetermined position, and the arms 19 are closed. In doing so, they engage under the lifted body 6 with their guide webs 32. FIG. 5C shows a position of the further gripping means 19 shortly before opening its arms 31 so as to engage around and under the body 6.

Then, as shown in FIG. 5 D, the housing 30 of the second gripping means 19 is moved away from the gripping means 18, along the transverse beam 14 of the portal 2, in the direction Y and, in doing so (or at the end of the path of movement), is lifted continuously until the body 6 is also located above the elements 9, preferably at the same height at which it is being held by the gripping jaws 23 of the first gripping means 18, at the location at which the guide webs 32 of the arms 31 have engaged under said body 6. During this displacement movement of the second gripping means 19 (in the direction Y) along the seized workpiece 6, the latter is progressively released from the bundle 5 in an upward direction, until the final position shown in FIG. 7 has been reached with respect to the path of displacement of the second gripping means 19. In this position, the body 6, now removed completely from the bundle 5, is held above the bundle 5, in a position parallel to the transverse beam 14, and is brought into a position shown in FIG. 2 by further movement of the portal 2 in the conveying direction T, in which position the body 6 can be placed on the inclined plane of the holding frame 20 by lowering and opening the two gripping means 18 and 19 or their gripping arms 23 and 31, respectively.

If, during the displacement movement of the second gripping means 19, the force exerted (in the direction Y) on the second gripping means 19, via its support location with the seized body 6, becomes too great, i. e. greater than a predetermined threshold of force, the displacement movement is stopped by a deflecting mechanism (not shown), and the control means can then trigger, for example, a reverse movement over a certain predetermined path length (again towards the first gripping means 18), said control means switching back again after displacement over a predetermined return path, and the displacement movement is switched back again to the original direction of movement. Instead or in addition, shaking of the first and/or second gripping means 18, 19 could be initiated over a predetermined time for easier separation of the seized body 6. However, if all this should fail, the gripping jaws 23 and the arms 31 will be opened by the program control, the seized body 5 will be released, and the process will start anew.

All of the aforementioned movements of the individual elements of the separating apparatus 1, namely of the portal 2, the sensor means 17, the first gripping means 18 and the further gripping means 19, as well as their gripping jaws and arms 31, respectively, are program-controlled by the central control means (not shown in the Figures) already mentioned above, which control means is suitably programmed depending on the length and cross-section of the respective rod-shaped bodies 6 to be picked up. When the separating apparatus 1 is to be used to separate other (thicker or thinner, longer or shorter, etc.) bodies 6, the control means is then newly programmed in a suitable manner.

It is particularly recommendable to apply to the first gripping means 18 and the further gripping means 19 and/or to their gripping jaws 23 or arms 31 and guide webs 32, respectively, on their surface areas facing the body 6 to be picked up, a friction-reducing surface coat, for example by flocking with a suitable plastic coat (e. g., of PTFE or a similar material), so as to minimize the friction forces occurring when relative movements take place between the gripping jaws 23 or the rotatable arms 31 and their guide webs 32, on the one hand, and the picked up body 6, on the other hand, as well as the driving forces required for said method. Moreover, suitable coats of this kind, which are not shown in the Figures, however, may also prevent the risk of damaging a body 6 when moving the further gripping means 19 along relative to the picked up body 6 or when rotating the latter about its pick-up location in the first gripping means 18 (if the body 6 is lifted by the second gripping means 19 during displacement of the latter).

Likewise, however, a freely rotatable roller (not shown) could be provided on each guide web, on which roller the lower side of the seized body 6 is supported, with the occurring frictional forces also being minimized, due to the rotatable rollers, when moving the second gripping means 19 in the Y direction.

The invention claimed is:

1. A method of separating rod-shaped bodies from a bundle of such bodies supplied in a conveying direction and located transversely to said direction, comprising:
    providing a sensor containing a proximity sensor which measures a distance from a surface of a rod-shaped body present below said sensor, in the region of the sensor's vertical center line,
    determining with said sensor a vertical position of a detection region on the surface of a portion of the body located at a top of the bundle, wherein the sensor is located at a lateral first end region of the body, lowering the sensor vertically from above towards the bundle of elongated bodies until it abuts the bundle, comparing a measured value of the distance with a predetermined minimum distance value, and if the measured value is greater than the minimum distance value, moving the sensor over a surface of the bundle in the conveying direction up to a location at which the measured distance equals the predetermined minimum distance value,
    seizing the body with a first gripper at a pick-up location which is laterally adjacent, as seen perpendicular to the conveying direction, to the detection region;
    vertically lifting the body by a predetermined distance;
    engaging a further gripper under the body at a location which is offset from the pick-up location, as seen perpendicular to the conveying direction, in a direction of a second end region of the body by a predetermined length;
    moving the further gripper along the body in an initial direction, up to the second end region of the body, thereby lifting the body out of the bundle;
    moving the body to a vertical position with the further gripper, during or after displacement thereof, wherein the vertical position is higher than a predetermined minimum height, and vertical center lines of the sensor and of both grippers are located in a common vertical plane extending transversely, perpendicular to the conveying direction; and
    moving the picked-up body to a depositing location using both grippers or holding the picked-up body in a holding position for transfer.

2. The method as claimed in claim 1, further comprising locating the detection region on a side of the pickup location facing the second end region.

3. The method as claimed in claim 2, wherein the step of engaging the further gripper under the body at a location which is offset from the pick-up location includes engaging the further gripper under the body immediately next to the detection region.

4. The method as claimed in claim 1, further comprising providing the detection region immediately next to the pick-up location.

5. The method as claimed in claim 1, further comprising continuously raising the further gripper after it has been engaged under the body as it is being moved towards the second end region, such that said further gripper, at an end of its path of movement towards the second end region, has brought the body up to the same vertical position as the first gripper.

6. The method as claimed in claim 1, further comprising stopping the further gripper as it is being moved towards the second end region as soon as there is a resistance to such movement that is greater than a predetermined value, then moving said further gripper back a predetermined distance in an opposite direction of the initial direction, and then moving the further gripper again in the initial direction of movement.

7. The method as claimed in claim 6, further comprising subjecting the bundle of elongated bodies to a shaking operation as the further gripper is moved in the opposite direction and subsequently moved in the initial direction of movement.

8. The method as claimed in claim 1, wherein the step of vertically lifting of the body is effected by both grippers up to a vertical position at which the picked-up body is displaceable above the bundle in the conveying direction.

9. The apparatus as claimed in claim 8, wherein the sensor is held on a holding frame of the first gripper and can thereby be lowered together with said sensor.

10. The apparatus as claimed in claim 9, wherein the sensor is supported, vertically displaceable with a guiding groove, by a holding flange which extends from the holding frame of the first gripper transversely to the conveying direction, in a perpendicular direction, there being provided a stop which limits the movement of the sensor vertically downwards.

11. The apparatus as claimed in claim 10, wherein the sensor is laterally located immediately next to the first gripper.

12. An apparatus for separating rod-shaped bodies from a bundle of such bodies, said apparatus comprising:
    a feeder for supplying the bundles of rod-shaped bodies along a conveying direction;
    a separator associated with the feeder, wherein the separator comprises a portal including a portal guide that extends horizontally perpendicular to the conveying direction, and at which there are arranged, displaceable in the longitudinal direction of as well as vertically to said portal guide, a first gripper for seizing a rod-shaped body; a sensor adjacent to the first gripper, said sensor being adapted to emit a sensor signal depending on the vertical distance between the sensor and a surface portion of an elongated body that is located below it and is provided with an upwardly extending guiding ramp, which has a convex curvature in the conveying direction, said guiding ramp allowing the sensor to be displaced without impact on the bundle of elongated bodies located below it, when being moved in the conveying direction;

a further gripper, which is displaceable along and perpendicular to the portal guide and is adapted to engage under an elongated body located below the portal guide, the sensor and first and further grippers also being further movable in the conveying direction; and a control, to which the sensor provided by the sensor is applied and by which all movement and actuation operations are program-controllable.

13. The apparatus as claimed in claim 12 wherein the portal is accordingly displaceable in the conveying direction in order to displace the sensor as well as both grippers in the conveying direction.

14. The apparatus as claimed in claim 12, wherein the feeder comprises, as its two longitudinal sides, two continuous conveyor belts, which extend parallel to the conveying direction and are provided with plate-shaped elements at their outside surfaces, said plate-shaped elements protruding perpendicularly to said conveyor belts and to the conveying direction and being spaced apart in the conveying direction, with a receiving space being formed, between each pair of successive plate-shaped elements, for the lateral end regions on one side of the rod-shaped body of a bundle.

15. The apparatus as claimed in claim 12, which is further provided with a discharge, which is arranged following the feeder and the separator in the conveying direction and by which the body lifted by both of the grippers can be discharged.

16. The apparatus as claimed in claim 15, wherein the discharge forms an inclined plane, which is inclined in the conveying direction and on which the deposited rod-shaped bodies are received, following each other in a row and abutting against a limit stop.

17. The apparatus as claimed in claim 16, wherein the discharge is provided with an arrangement for lateral alignment of the ends of the deposited rod-shaped bodies.

18. The apparatus as claimed in claim 15, wherein the discharge is configured to seize and transfer the rod-shaped bodies in the discharge to a further subsequent transport or processing station.

19. The apparatus as claimed in claim 12, wherein the sensor comprises a proximity sensor.

20. The apparatus as claimed in claim 12, wherein the first gripper comprises two gripping jaws for seizing a rod-shaped body.

21. The apparatus as claimed in claim 20, wherein both gripping jaws are provided with inclined external surfaces on their sides facing away from each other, said surfaces converging downwardly.

22. The apparatus as claimed in claim 12, wherein the further gripper comprises two rotatable arms whose free ends are provided with guiding webs which are directed towards each other and contact each other by their end faces in the closed state of the further gripper, so as to engage under an elongated body.

23. The apparatus as claimed in claim 22, wherein the guiding webs are provided with a wear-protection layer at least in their upper surface region.

24. The apparatus as claimed in claim 12, wherein the portal guide is provided with a third gripper, which is displaceable perpendicular to an along said portal guide and is also adapted to engage under the elongated body.

* * * * *